C. S. BARRELL.
TIRE CHAIN.
APPLICATION FILED SEPT. 12, 1916.

1,374,347.

Patented Apr. 12, 1921.
2 SHEETS—SHEET 1.

Inventor:
Charles S. Barrell.
By Henry J. Miller.
atty.

C. S. BARRELL.
TIRE CHAIN.
APPLICATION FILED SEPT. 12, 1916.

1,374,347.

Patented Apr. 12, 1921.
2 SHEETS—SHEET 2.

UNITED STATES PATENT OFFICE.

CHARLES S. BARRELL, OF BOSTON, MASSACHUSETTS.

TIRE-CHAIN.

1,374,347.  Specification of Letters Patent.  Patented Apr. 12, 1921.

Application filed September 12, 1916. Serial No. 119,692.

*To all whom it may concern:*

Be it known that I, CHARLES S. BARRELL, a citizen of the United States, residing at Boston, in the county of Suffolk and State of Massachusetts, have invented new and useful Improvements in Tire-Chains, of which the following is a specification, reference being had to the accompanying drawings, forming part thereof.

This invention has reference to improvements in devices for preventing the slipping of wheels, and relates particularly to such devices known as tire chains adapted for use on pneumatic and other elastic or resilient tires.

It is well known that the tire chains heretofore used have not been entirely satisfactory. The types known earlier in the art and used to some extent which were applied and maintained tight upon the tire, injure and destroy the tire by their dragging movement. In order to overcome the objection to the tight chain, chains have been applied loose. There are, however, disadvantages inherent in a loose chain, such as injury to the mud guard and the cross chains, excessive flying of mud, and the noise made by a loose chain.

Moreover, the cross chains heretofore used soon wear flat on the one surface thereof which comes in contact with the ground, and thus not only lose their efficiency as an anti-skidding and traction device, but also they develop sharp edges which cut and thereby greatly injure the tire.

One object of the invention is to provide a tire chain in which the links in their extension from one side of the tire tread have characteristics which differ in adjoining links as to location of parts of said links relative to the surface of the tread portion of the tire whereby the bearing of said links against said tread surface differs in progression through more than two of the adjoining links whereby rotative action of the links is facilitated.

It is the main object of the present invention to construct the cross chains so that even when applied tight, as in the tight tire chain of the earlier art and are thereby particularly incorporated as a part of the tire, the small movement always present in any type of tight tire chain, which is not positively attached to the tire, will cause practically no injury to the tire because the cross chains present only round and smooth surfaces however much they become worn, and are so constructed that although maintained tight upon the tire, they are rotated thereon by the action of the wheel rubbing the cross chains upon the ground. They, therefore, neither wear flat nor develop sharp edges, and so cause no cutting, abrading or substantial wearing of the tire. The rotation of the cross chains between the tread of the wheel and the roadway, is insured by the shape and correlation of the links of the chain, as will be more fully explained.

The features of construction and combination of parts will hereinafter be more fully described and pointed out in the claims.

Referring to the drawings:—

Similar numerals of reference designate corresponding parts throughout.

Figure 1:
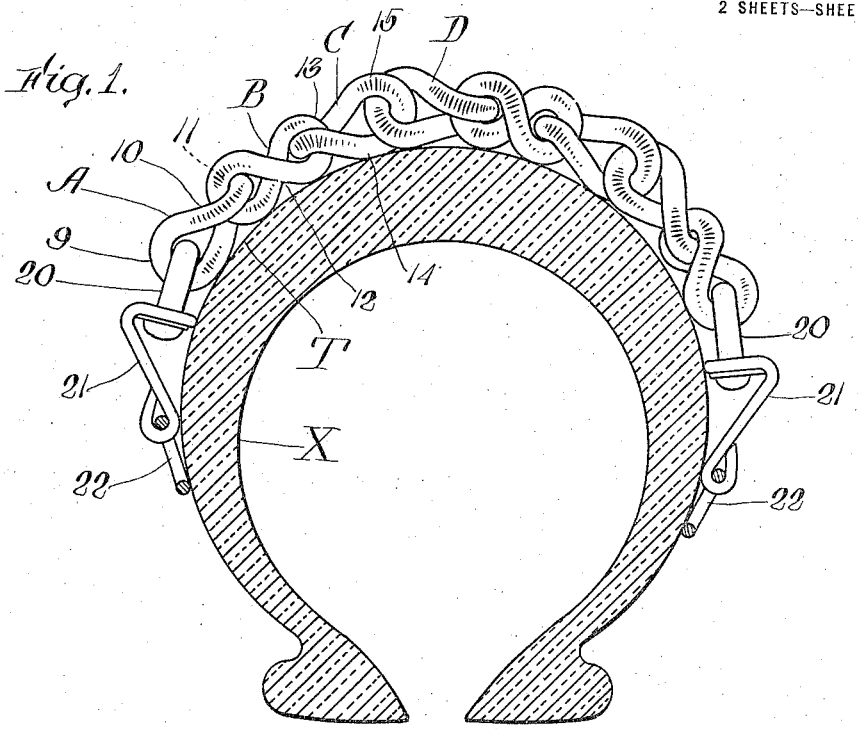
Figure 1, represents a cross sectional view of portions of a tire having mounted thereon a chain of the improved construction.
Figure 2:
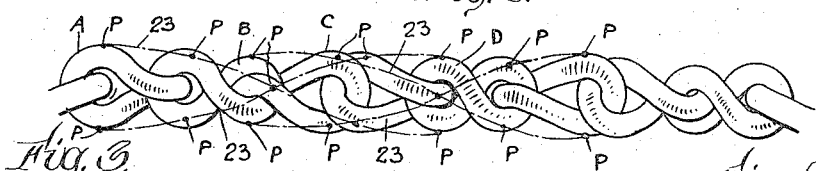
Fig. 2 is a side view of a portion of a cross chain and illustrating the helical lines occupied by portions of the links which contact with the tire.

In each of the Figs. 1 and 2 I have shown but one cross chain, with the side chains in section. It being understood that there are the usual number of cross chains and that the side chains extend completely around the sides of the tire as usual.

In carrying my present invention into practice it is my object to provide a cross chain of such nature that when sustained in contact with the periphery of a tire contact of said improved cross chain with the roadway will result in the rotation of the chain with the result that such rotation will effect the rolling of the chain against the periphery of the tire, each engagement of a chain with the roadway of course effecting only a slight rolling movement of the chain on the tire. The construction of my improved chain will be more readily understood by reference to the drawings it being premised that the improvement resides in the chain as a whole, at least as distinguished from any particular link although reference will be made to the individual links.

Figure 3:
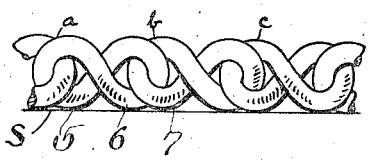
Fig. 3, represents a plan view of a chain before it is twisted sufficiently to produce my new improvement.
Figure 4:
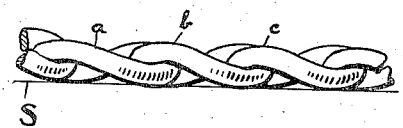
Fig. 4, represents an edge view of the same.
Figure 6:
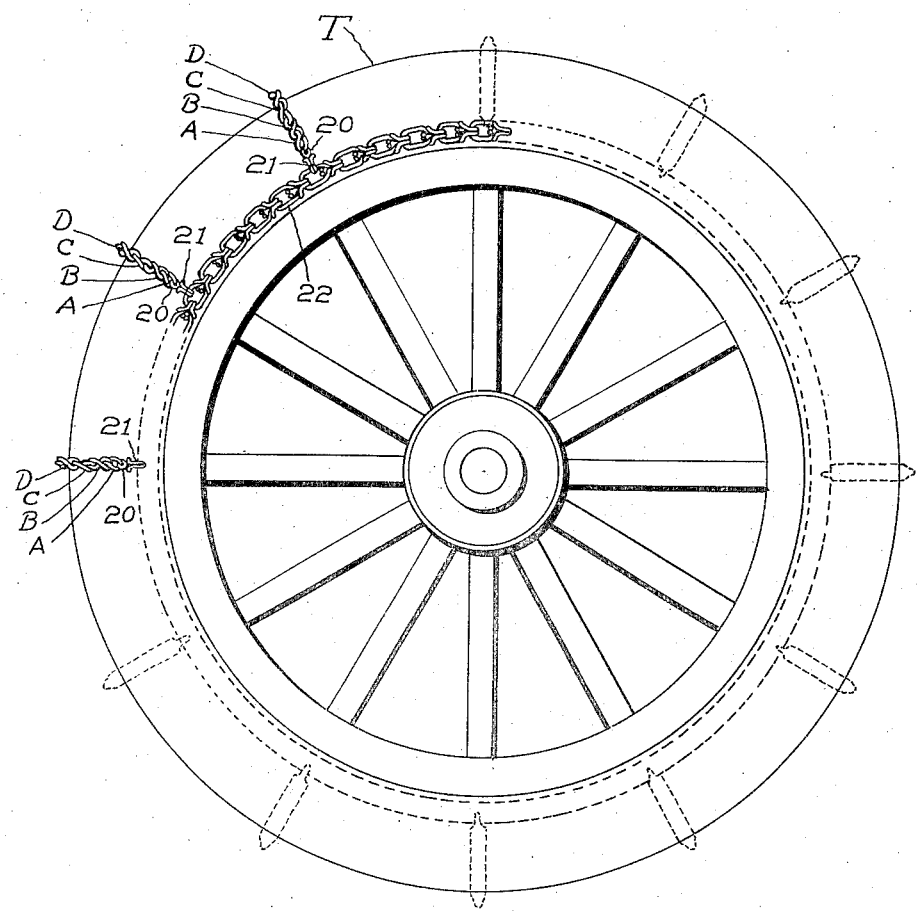
Fig. 6 is a side elevation of a tire equipped with a chain embodying the invention.

In the method of construction I prefer to take or produce a chain similar to that shown in Figs. 3 and 4 of the drawings in which the several links have been twisted to bring their side bars in diagonally crossed relation. These links $a$, $b$ and $c$ are of similar shape and if placed in position on a plane surface S as in Fig. 3 the side bars of all of the links would touch such plane surface substantially in alinement while if said chains be placed on said surface S as shown in Fig. 4 the links $a$, $b$ and $c$, will have substantially a flat bearing and rotation of the chain or of any of its links will be resisted by the transverse extension or bearing of the end portions of the links $a$, $b$ and $c$. The purpose of the proposed treatment is to carry the point 6 of link $a$ forward of point 5 of said link and hence to bring point 7 of link $b$ forward or upward and to continue this progressive twisting throughout at least three of the links. The method of accomplishing this substantially is to twist the chain on its axis; that is, the links, such, for example, as shown in Figs. 3 and 4, may be given a degree of twist so as to open out the links somewhat.

In Fig. 1 of the drawings I have endeavored to show the construction referred to but in view of the limitations of shading the showing is only approximate. In said figure it will be seen that end 9 of link A tips at its upper part forward of the point at which its lower part touches the surface T of tire X and that side bar 10 of said link A bends downwardly and then extends as the end 11 upwardly through link B to indicate that link B is tipped forward at its upper part farther than link A so that the side arm 12 of link B curves in riding contact with th surface T while the end 13 of link B extends at a different angle with respect to said surface T. Link C has its side bar 14 extending downwardly and rearwardly relative to bar 12 of link B and the end 15 of link C extends upwardly through link D and forwardly of the lower end of said bar 14. These relative bendings of the chain members continue progressively throughout the length of the chain.

The end links of the chain thus constructed are supplied with the swivel members 20, 20 which are rotatably mounted in bearings of the securing devices 21, 21 by means of which the cross chain is secured to side chains 22, 22 of which parts only are shown as any usual side chains may be used. It being understood that any necessary or desirable number of the cross chains may be thus applied to a tire.

Figure 5:
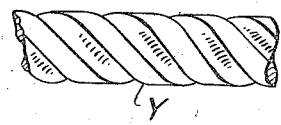
Fig. 5, represents diagrammatically the proposed spiral riding or bearing effect sought to be accomplished in this improved chain.

From the above description it will be seen that in any three links the side bars meet the surface T in helical progression and in the rotation of the chain constitute riding members similar to the spiral member Y shown in Fig. 5 which assist rather than retard the rotation of the chain and that at no time can the links lie flatwise against the surface T. In effect the twisting of the chain substantially as above described renders the form of each of the links such that each of said links constitutes practically a roller element having curved bars adapted to grip the roadway and to frictionally engage the periphery of the tire on which the chain is mounted. The associated links constituting the chain thus comprising a series of such roller elements flexibly connected to form a flexible roller member having gripping and riding ribs which extend progressively and helically continuing from one element or link of said member to the next.

The twisting of the chain to give it the character described may be effected by holding the central links and twisting the ends of the chain on its axis in opposite directions. In the present instance of the invention, each cross chain comprises a series of links, each being so twisted that successive links occupy progressive angular positions lengthwise of the chain, and each link having opposed reversely curved side members presenting portions or points $p$ for contact with the tire and lying on helices 23 having an axis extending longitudinally of the chain, thereby giving the latter an outer contour for rolling contact with the tire.

It will be understood that the invention is not limited to the specific embodiment shown, and that various deviations may be made therefrom without departing from the spirit and scope of the appended claims.

Having thus described my invention I claim as new and desire to secure by Letters Patent:

1. A traction device for tires, comprising a cross chain having links so twisted that corresponding portions of successive links occupy progressive angular positions giving the chain an outer contour for rolling contact with the tire.

2. A traction device for tires, comprising a cross chain having links so twisted that corresponding portions of successive links occupy progressive angular positions giving the chain an outer contour for rolling contact with the tire, and swivel devices connected to the terminals of the cross chain and adapted for connection with circular members for location at the sides of the tire.

3. A traction device for tires, comprising a cross chain having a series of links, a plurality of which are provided with opposed side members presenting portions for contact with the ground and tire and collectively lying on helices having an axis extending longitudinally of the chain, thereby giving the latter an outer contour for rolling contact with the tire.

4. A traction device for tires, comprising a cross chain having a series of links, a plurality of which are twisted to present crossing side members spaced at their crossing points, said members having tire engaging portions located in progressive angular advance lengthwise of the cross chain, and swivel devices connected to the terminals of the cross chain and adapted for connection with circular members for location at the sides of the tire.

5. A traction device for a tire, comprising a cross chain having a series of links, a plurality of which are twisted correlatively to form a spiral twist extending lengthwise of the cross chain, that the latter may have rolling contact with the tire.

6. A traction device for a tire, comprising circular side chains and cross chains connected thereto, each having a series of links, a plurality of which are twisted correlatively to form a spiral twist extending lengthwise of the cross chain, that the latter may have rolling contact with the tire, and swivel devices connected to the terminals of the cross chains adapted to be secured to the circular side chains.

CHARLES S. BARRELL.